(12) United States Patent
Williams et al.

(10) Patent No.: US 12,446,909 B2
(45) Date of Patent: Oct. 21, 2025

(54) JAW ASSEMBLY FOR A VESSEL SEALER

(71) Applicant: CONMED CORPORATION, Utica, NY (US)

(72) Inventors: Mason Williams, Denver, CO (US); Michael Olichney, Castle Rock, CO (US); Alyssa Spomer, Fort Collins, CO (US)

(73) Assignee: CONMED CORPORATION, Utica, NY (US)

( * ) Notice: Subject to any disclaimer, the term of this patent is extended or adjusted under 35 U.S.C. 154(b) by 76 days.

(21) Appl. No.: 15/646,274

(22) Filed: Jul. 11, 2017

(65) Prior Publication Data

US 2019/0015124 A1    Jan. 17, 2019

(51) Int. Cl.
    *A61B 17/28*     (2006.01)
    *A61B 18/14*     (2006.01)
    (Continued)

(52) U.S. Cl.
CPC ..... *A61B 17/282* (2013.01); *A61B 2017/1107* (2013.01); *A61B 17/22031* (2013.01); *A61B 2017/2906* (2013.01); *A61B 2017/2919* (2013.01); *A61B 2018/00601* (2013.01); *A61B 2018/00607* (2013.01);
(Continued)

(58) Field of Classification Search
CPC ............ A61B 2017/1107; A61B 17/28; A61B 17/282; A61B 17/22031; A61B 18/1445; A61B 17/295; A61B 2017/2939; A61B 2017/301; A61B 2017/2947;
(Continued)

(56) References Cited

U.S. PATENT DOCUMENTS 5,626,609 A * 5/1997 Zvenyatsky ........... A61B 17/29
                                              606/208
8,568,412 B2 * 10/2013 Brandt ............... A61B 18/1445
                                              606/205

(Continued)

FOREIGN PATENT DOCUMENTS

CN       203736304 U     7/2014
EP         0637939 A1     2/1995
(Continued)

OTHER PUBLICATIONS

International Search Report Form PCT/ISA/220, International Application No. PCT/US2018/041368, pp. 1-11, Dated Oct. 12, 2018.
(Continued)

*Primary Examiner* — Linda C Dvorak
*Assistant Examiner* — Christine A Dedoulis
(74) *Attorney, Agent, or Firm* — Bond, Schoeneck & King, PLLC; Frederick J.M. Price

(57) ABSTRACT

A jaw assembly for vessel sealing device having a pair of jaw member that are pivotally coupled together via two flanges associated with one of the jaw members and a single, centrally positioned flange associated with the other of the jaw members. The flanges include cam slots so that axial movement of a drive shaft can open and close the jaw members. The jaw members may include a knife pathway for axial movement of a knife blade that is positioned to one side of the central flange and thus offset from the central axis of the jaws.

7 Claims, 5 Drawing Sheets

(51) Int. Cl.
*A61B 17/11* (2006.01)
*A61B 17/22* (2006.01)
*A61B 17/29* (2006.01)
*A61B 18/00* (2006.01)

(52) U.S. Cl.
CPC .............. *A61B 2018/0063* (2013.01); *A61B 2018/1412* (2013.01); *A61B 2018/1432* (2013.01); *A61B 18/1445* (2013.01); *A61B 2018/1455* (2013.01)

(58) Field of Classification Search
CPC ...... A61B 2017/294; A61B 2017/2936; A61B 2017/2932; A61B 2017/2926
USPC ........................................................ 606/207
See application file for complete search history.

(56) References Cited

U.S. PATENT DOCUMENTS

| | | | |
|---|---|---|---|
| 8,734,443 B2 | 5/2014 | Hixson et al. | |
| 8,747,434 B2* | 6/2014 | Larson | A61B 18/1445 606/205 |
| 9,084,608 B2* | 7/2015 | Larson | A61B 18/1445 |
| 9,113,938 B2* | 8/2015 | Kerr | A61B 18/1442 |
| 9,381,059 B2 | 7/2016 | Garrison | |
| 2005/0222611 A1* | 10/2005 | Weitkamp | A61B 17/29 606/205 |
| 2007/0173814 A1* | 7/2007 | Hixson | A61B 18/1445 606/51 |
| 2012/0232338 A1* | 9/2012 | Livneh | A61B 1/00101 600/104 |
| 2012/0259331 A1* | 10/2012 | Garrison | A61B 18/1445 606/51 |
| 2013/0066318 A1 | 3/2013 | Kerr | |
| 2014/0257274 A1* | 9/2014 | Mccullough, Jr. | A61B 18/1445 606/40 |
| 2014/0276666 A1* | 9/2014 | Malkowski | A61B 17/29 606/1 |
| 2017/0354458 A1* | 12/2017 | Wang | A61B 18/1445 |

FOREIGN PATENT DOCUMENTS

| | | |
|---|---|---|
| EP | 2294998 | 3/2011 |
| EP | 2520242 | 11/2012 |
| EP | 2722017 | 4/2014 |
| JP | 2000-262534 | 9/2000 |
| JP | 2007-195982 A | 5/2013 |
| WO | 2016/045041 | 3/2016 |

OTHER PUBLICATIONS

JP Office Action, dated Jun. 22, 2021, Application No. 2020-501336, pp. 1-6.
Chinese Office Action, Application No. 201880046793.7, Issued Jul. 10, 2023, pp. 1-7.
Translated Chinese Office Action, App. No. 201880046793.7, dated Nov. 10, 2023, pp. 1-14.

* cited by examiner

JAW ASSEMBLY FOR A VESSEL SEALER

BACKGROUND OF THE INVENTION

1. Field of the Invention

The present invention relates to electrosurgical vessel sealers and, more specifically, to a hinged jaw assembly formed from jaw members having differing numbers of flanges.

2. Description of the Related Art

Electrosurgical vessel sealers are used for the occlusion of blood vessels and halting of bleeding during surgical procedures. The jaws of the vessel sealer are interconnected to an electrosurgical generator that can selective supply radiofrequency (RF) energy to the jaws for the desiccation and sealing of a blood vessel that has been clamped between the jaws. A blade may be additionally incorporated into the jaws for cutting of the sealed blood vessel along an intermediate portion of the seal created by the energized jaws.

Conventional vessel sealers have jaws formed from two jaw members, each of which has a flange connected to a common hinge pin so that the jaws scissor in response to user actuation of a handle. This structural arrangement is mechanically inefficient, however, due to a loss of energy and unbalanced forces that lead to inefficient clamping and user hand fatigue. Current approaches to solving this problem use dual hinges on both jaw members that must be nested together, thereby requiring the use of a significant amount of the space that is otherwise required for elements such as the electrosurgical supply wires and cutting blade. Accordingly, there is a need for improved hinging of the vessel sealer jaw members that provides efficient mechanical clamping while optimizing the amount of space required for hinging of the jaws.

BRIEF SUMMARY OF THE INVENTION

The present invention is a jaw assembly for a vessel sealing device having improved mechanical stability in a reduced amount of space. The jaw assembly has a first jaw member with first and second spaced apart flanges, a second jaw member with a single, third flange positioned between the first and second flanges of the first jaw member and pivotally connected to the first and second flanges. The jaw assembly may further include a drive shaft with a clevis coupled first and second cam slots into the first and second jaw members and to a third cam slot in the third flange. The first jaw member and the second jaw member are pivotally connected by a pivot pin and the pivot pin may have a shoulder positioned in abutting relation to the third flange of the second jaw member. The first and second jaw members may include corresponding first and second slots defining a knife pathway and a knife blade may extend from the drive shaft and to one side of the single third flange. The knife pathway can curve one side of the single third flange to the end of the jaws. An outer shaft may surround the drive shaft and support the pivot pin. First and second wires may extend between one of the first and second flanges and the outer shaft for coupling to first and second conductive faces supported by the first and second jaw members.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
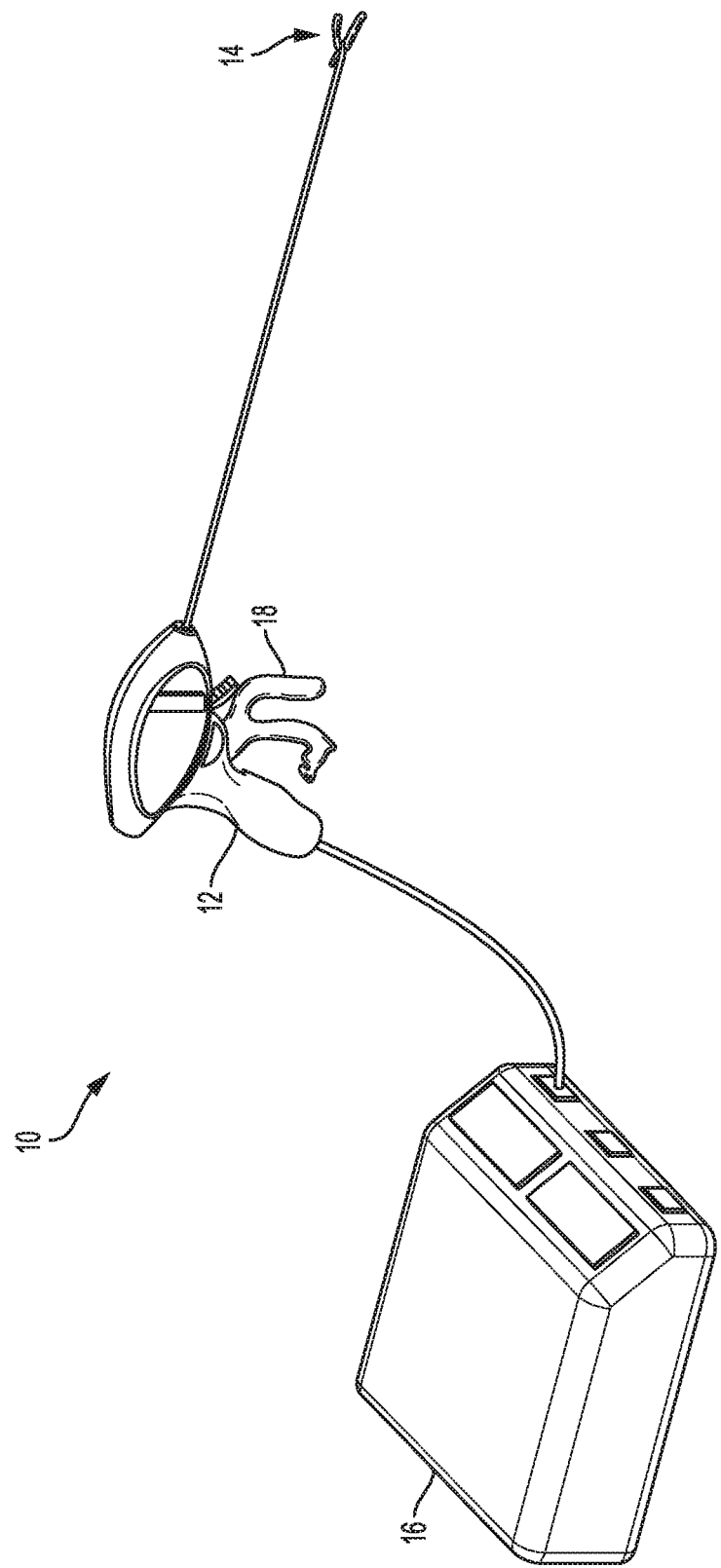
FIG. 1 is a perspective view of a vessel sealing system having hinged jaws according to the present invention.

Referring to the figures, wherein like numerals refer to like parts throughout, there is seen in FIG. 1 a vessel sealing system 10 comprising a vessel sealer 12 having jaws 14 that are interconnected to an electrosurgical generator 16 that can supply RF energy to jaws 14 for the desiccation of a blood vessel trapped between jaws 14. Jaws 14 are hinged to be open and closed in response to a user operating a handle 18 of sealer 12.

Figure 2:
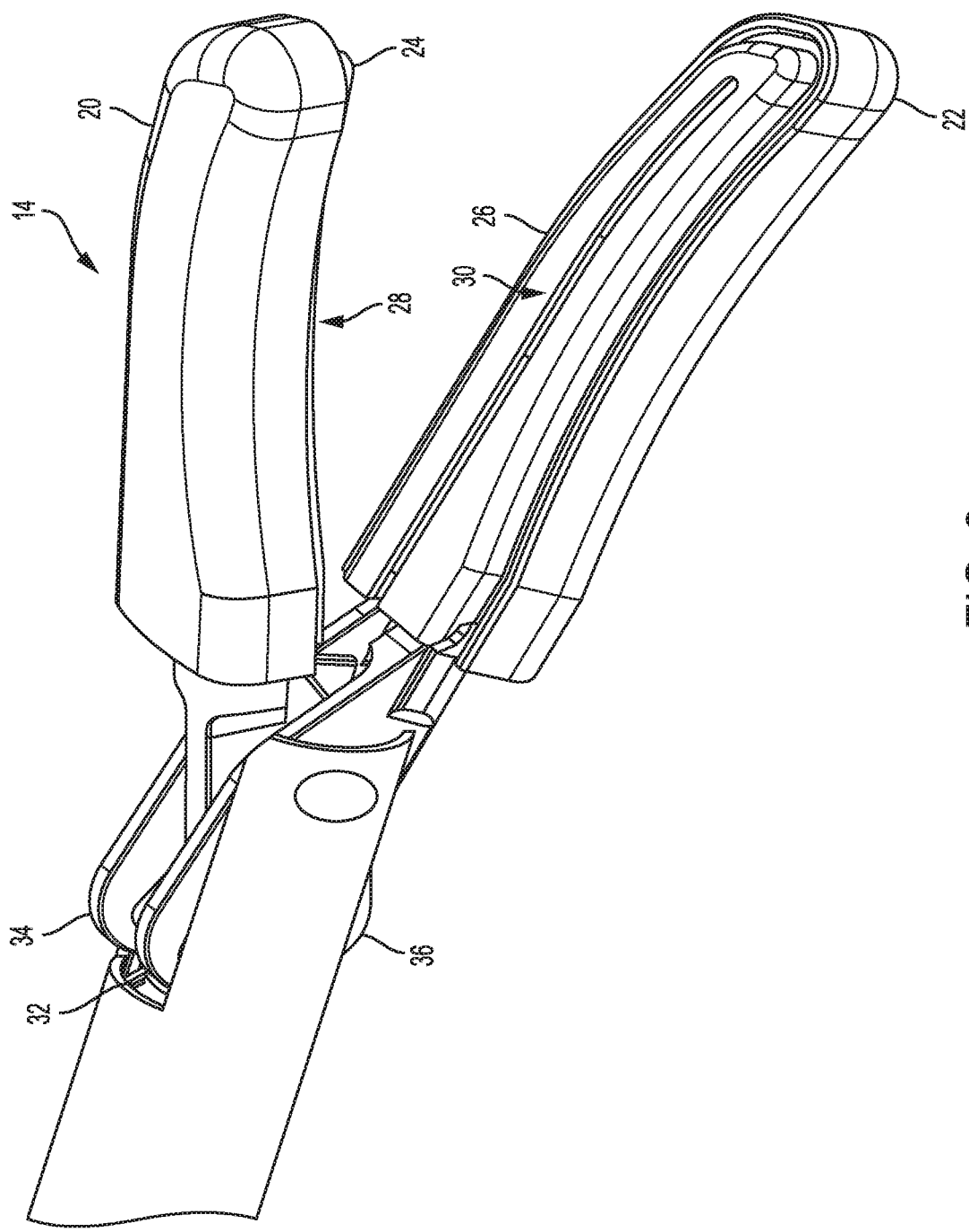
FIG. 2 is perspective view of a hinged jaw for a vessel sealing system according to the present invention.
Figure 3:
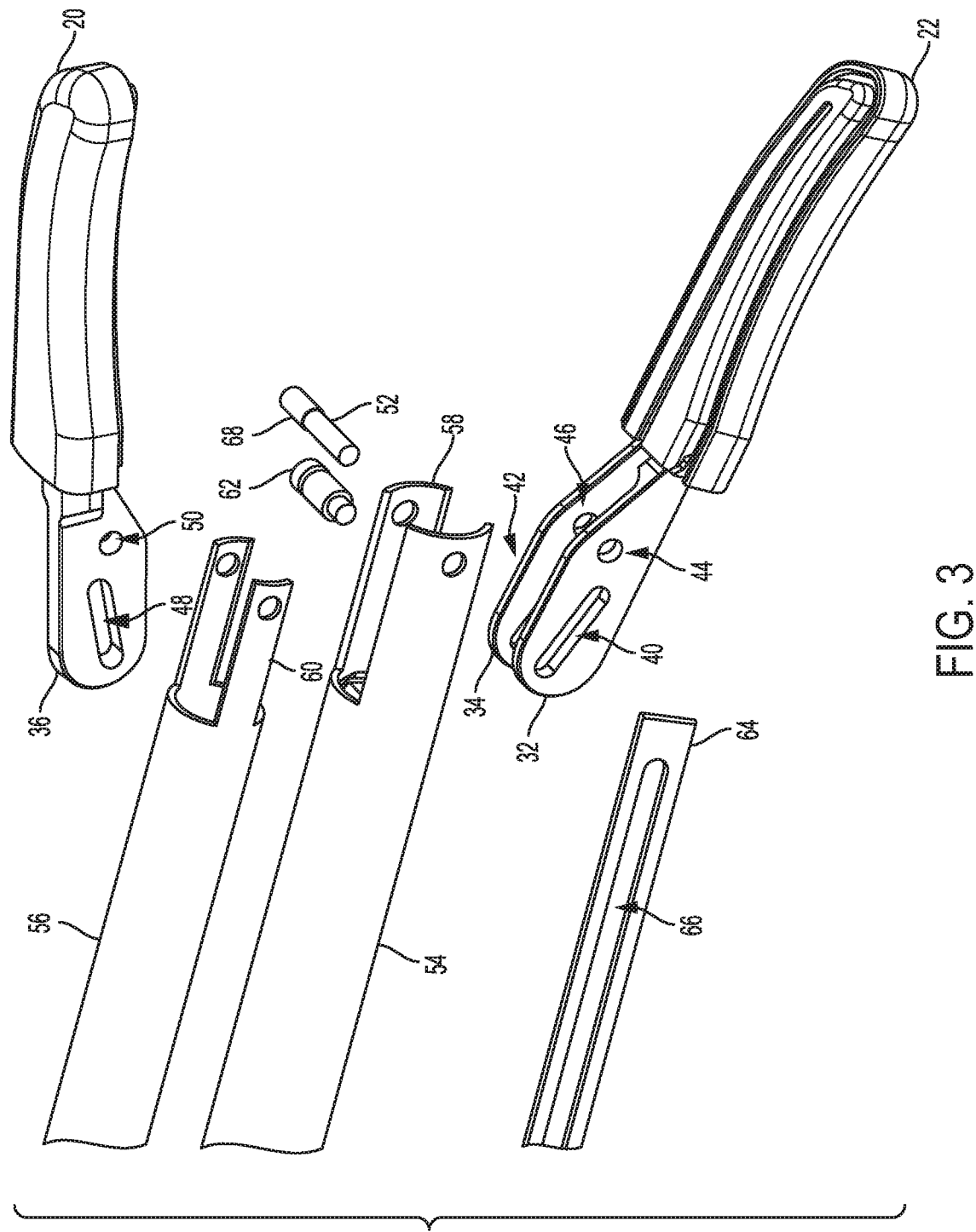
FIG. 3 is an exploded view of a hinged jaw for a vessel sealing system according to the present invention.
Figure 4:
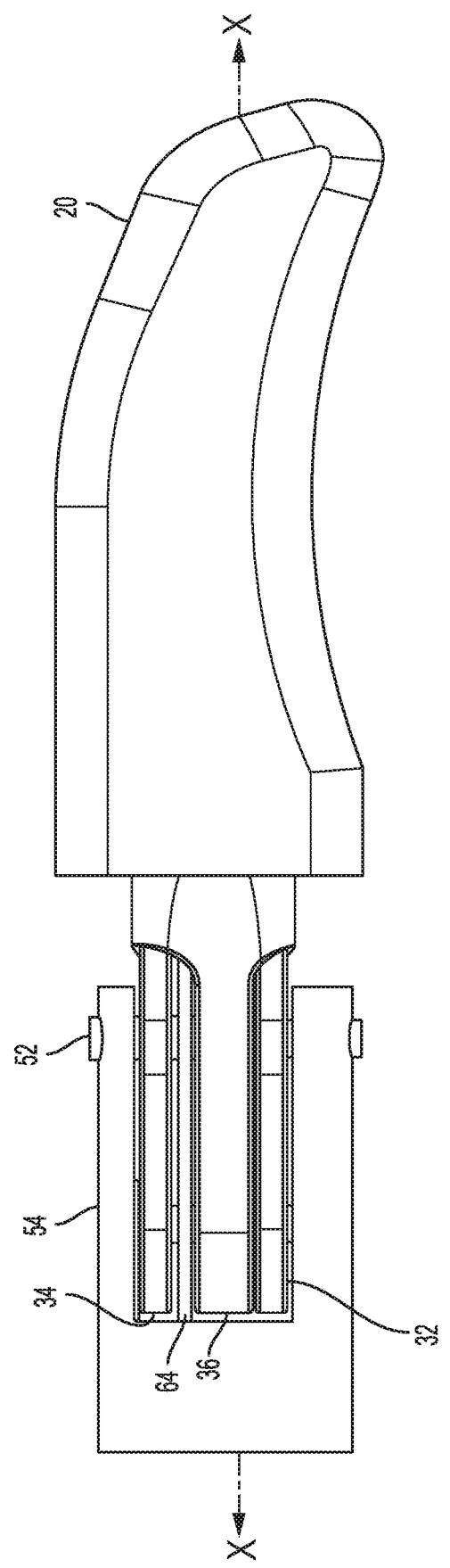
FIG. 4 is top plan of a hinged jaw for a vessel sealing system according to the present invention.

As seen in FIG. 2, jaws 14 are comprised of two opposing jaw members 20 and 22. Jaw members 20 and 22 include inner conductive faces 24 and 26 that are electrically isolated from the rest of jaws 14 and sealer 10 and interconnected to electrosurgical generator 16. Inner conductive faces 24 and 26 have slots 28 and 30 formed therethrough that, when jaw members 20 and 22 are closed, align to define a knife pathway intersection the region where tissue is desiccated between jaws 14 when they are energized. As seen in FIGS. 2 and 3, jaws 14 and the knife pathway defined by slots 28 and 30 may be curved in one direction to enhance visibility of target tissue during use and thus provide for improved utility during open surgical procedures.

Figure 5:
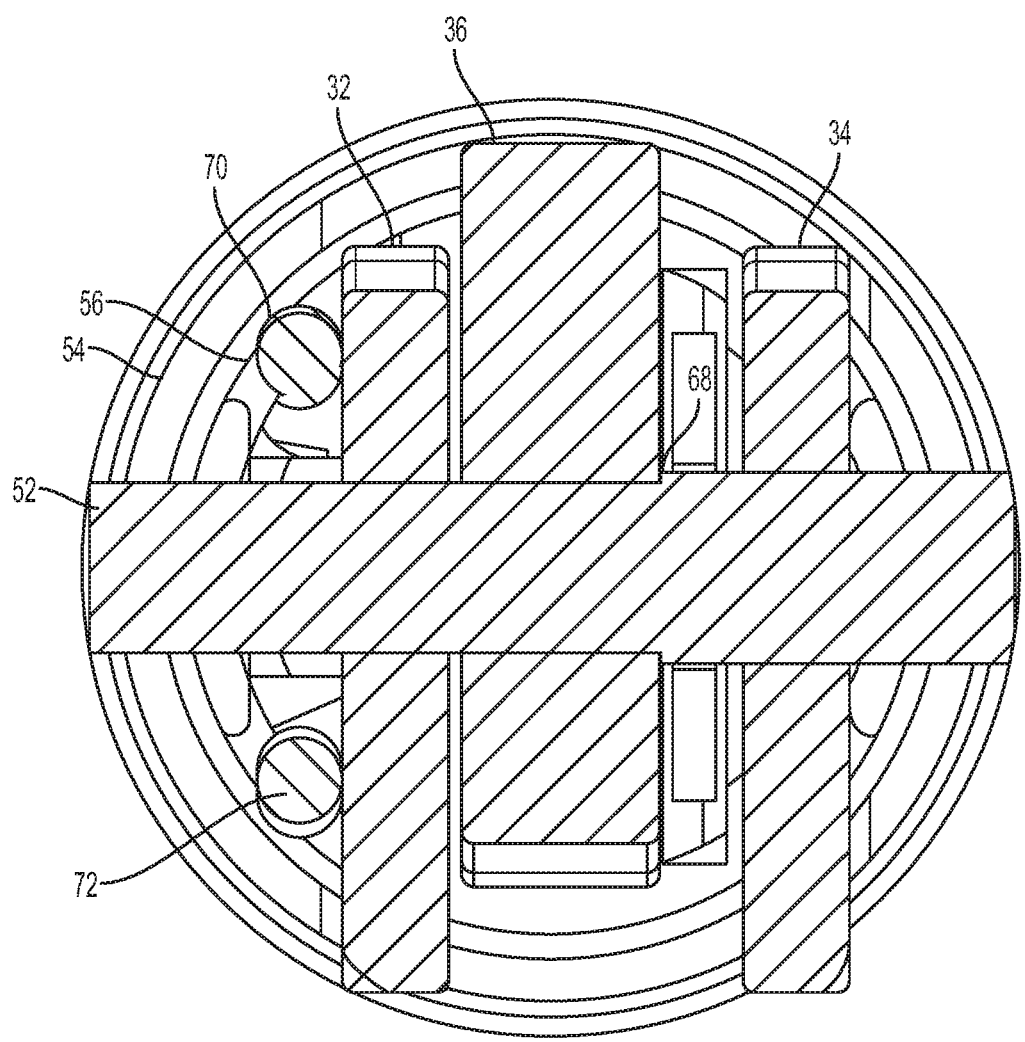
FIG. 5 is cross-section of a hinged jaw for a vessel sealing system according to the present invention.

Referring to FIG. 3, one of jaw members 20 and 22 (shown as jaw member 22 but could instead be jaw member 20) includes dual, spaced apart hinge flanges 32 and 34. The other of jaw members 20 and 22 (shown as jaw member 20 but could instead be jaw member 22) includes a single hinge flange 36 positioned between dual hinge flanges 32 and 34 and centrally along axis X-X of jaws 14. Dual hinge flanges 32 and 34 include two opposing cam slots 40 and 42 as well as a two opposing pivot holes 44 and 46 formed therethrough. Single flange 36 includes a corresponding single cam slot 48 and a corresponding single pivot hole 50 formed therethrough. A pivot pin 52 extends through two opposing pivot holes 44 and 46 of dual hinge flanges 32 and 34 as well as single pivot hole 50 when sealer 10 is assembled. Pivot pin 52 is fixed in position to a clevis 58 at the end of an outer shaft 54 that extends longitudinally along axis X-X. A drive shaft 56 having a corresponding cross-section is positioned within outer shaft 54 for movement therein. Drive shaft 56 is coupled to opposing cam slots 40 and 42 of dual hinge flanges 32 and 34 and to cam slot 48 of single flange 36 by a clevis 60 and clevis pin 62 positioned at one end. Cam slots 40 and 42 of dual hinge flanges 32 and 34 and cam slot 48 of single flange 36 extend within dual hinge flanges 32 and 34 and single hinge flange 36 along opposite angles relative to the longitudinal axis XX of jaws 14 and the movement of drive shaft 56. As a result, axial movement of drive shaft 56 along axis X-X will cause dual hinge flanges 32 and 34 and single hinge flange 36 to pivot about pivot pin 52 in opposite directions, thereby driving jaws 14 into the open or closed positions depending on the direction of movement of drive shaft 56. As seen in FIG. 3 and FIG. 5, pivot pin 52 may include a shoulder 68 positioned in abutting relation to single flange 36 to restrict transverse movement within outer shaft 54. Due to positioning of single hinge flange 42 between dual hinge flanges 32 and 34, jaws 14 are mechanically stable and do not suffer from a loss of energy due to unbalanced forces about pivot pin 52 when closed about tissue. As a result of this mechanical stability, jaws 14 are more mechanically efficient and thus the operation of jaws 14 to repeatedly clamp tissue is less likely to lead to hand fatigue.

For mechanical cutting operations, a moveable knife blade 64 may be positioned within drive shaft 56 and extended and retracted along the knife pathway defined by slots 32 and 34 when jaw members 20 and 22 are closed to cut tissue after desiccation with RF energy. Knife blade 64 has a longitudinal slot 66 in which pivot pin 52 and cam pin 62 may be located when vessel sealer 10 is assembled so that knife blade 64 can be driven axially along axis X-X and through knife pathway. Referring FIG. 5, knife blade 64 is positioned to one side of single flange 36 and is thus off-center with respect to the longitudinal axis X-X. Preferably, knife blade 64 is off-set to the outer side of any curvature provided to jaws 14 so that knife blade 64 will bend through a gentler curve when extended along the knife pathway defined by slots 32 and 34 that if knife blade 64 were off-set to the other side of single flange 36. As seen in FIG. 5, electrosurgical generator 16 may be interconnected to jaw members 20 and 22 by a pair of wires 70 and 72 that extend along the inside of outer shaft 54 for coupling to inner conductive faces 24 and 26, respectively, so that generator 16 can provide RF energy to jaw members 20 and 22.

Vessel sealer 10 may thus be used by clamping jaws 14 about a vessel to be sealed and then supplying energy with electrosurgical generator 16 to conductive faces 24 and 26 via wires 70 and 72 that are easily contained within spaces in outer shaft 54 created by the use of dual hinge flanges 32 and 34 and single hinge flange 36. After desiccation of the vessel is completed, knife blade 64 may be extended through the knife pathway defined by slots 28 and 30 to sever the desiccated vessel within the desiccated region so that the ends of the severed vessel remain sealed. The off-center positioning of knife blade 64 allows for knife blade 64 to pass more easily along any curved portion of the knife pathway defined by slots 28 and 30.

What is claimed is:

1. A jaw assembly for a vessel sealing device, comprising:
an outer shaft terminating in a first clevis;
a first jaw member having first and second spaced apart hinge flanges, wherein both of the first and second spaced apart hinge flanges are pivotally mounted to the first clevis of the outer shaft for pivotal movement relative to the outer shaft;
a second jaw member having only a single third hinge flange extending therefrom, wherein the third hinge flange is positioned between the first and second hinge flanges of the first jaw member such that the single third hinge flange is immediately adjacent to both the first and second spaced apart hinge flanges and the third hinge flange is pivotally mounted to the first clevis of the outer shaft for pivotal movement relative to the outer shaft;
wherein the first clevis of the outer shaft is pivotally coupled to the first and second spaced apart hinge flanges and the third hinge flange by a pin to form a pivot consisting of the pin, the first and second spaced apart hinge flanges and the single third hinge flange so that the first and second spaced apart flanges of the first jaw member and the single third hinge flange of the second jaw member all can pivot relative to the outer shaft, wherein the pin has a shoulder normal to an axis of the pin produced by a change in diameter along an intermediate portion of the pin with the shoulder of the pin positioned in abutting relation to a lateral side of the single third hinge flange of the second jaw member and restricting transverse movement of the single third hinge flange within the outer shaft; and
a drive shaft positioned within the outer shaft and coupled to the first jaw member and the second jaw member by a second clevis that is coupled to corresponding first and second cam slots in the first and second hinge flanges and a third cam slot in the single third hinge flange so that axial movement of the drive shaft will cause the first hinge flange and the second hinge flange to pivot about the pin in a first direction and single third hinge flange to pivot about the pin in an opposite direction.

2. The jaw assembly of claim 1, wherein the first and second jaw members includes corresponding first and second slots defining a knife pathway.

3. The jaw assembly of claim 2, further comprising a knife blade extending from the drive shaft and to one side of the single third flange.

4. The jaw assembly of claim 3, wherein the knife pathway curves inwardly from a first end of the knife pathway positioned to one side of the single third hinge flange.

5. The jaw assembly of claim 4, wherein the outer shaft surrounds the drive shaft and supports the pivot pin.

6. The jaw assembly of claim 5, further comprising first and second wires extending between one of the first and second hinge flanges and the outer shaft and coupled to first and second conductive faces, respectively.

7. The jaw assembly of claim 6, wherein the first and second conductive faces are supported by and electrically isolated from the first and second jaw members, respectively.

* * * * *